(12) United States Patent
Jiang

(10) Patent No.: US 9,497,307 B2
(45) Date of Patent: Nov. 15, 2016

(54) SMART WATCH

(71) Applicant: Hongming Jiang, Zhejiang (CN)

(72) Inventor: Hongming Jiang, Zhejiang (CN)

(*) Notice: Subject to any disclaimer, the term of this patent is extended or adjusted under 35 U.S.C. 154(b) by 0 days.

(21) Appl. No.: 14/781,543

(22) PCT Filed: Mar. 31, 2014

(86) PCT No.: PCT/CN2014/074415
§ 371 (c)(1),
(2) Date: Sep. 30, 2015

(87) PCT Pub. No.: WO2014/161456
PCT Pub. Date: Oct. 9, 2014

(65) Prior Publication Data
US 2016/0057268 A1 Feb. 25, 2016

(30) Foreign Application Priority Data

Apr. 1, 2013 (CN) .................... 2013 2 0166921 U

(51) Int. Cl.
*H04M 1/00* (2006.01)
*H04M 1/725* (2006.01)
*H04B 5/00* (2006.01)
(Continued)

(52) U.S. Cl.
CPC ............ *H04M 1/7253* (2013.01); *G01C 17/00* (2013.01); *G04B 47/00* (2013.01); *G04G 21/02* (2013.01); *G04G 21/04* (2013.01); *H04B 1/385* (2013.01);
(Continued)

(58) Field of Classification Search
CPC . H04M 1/7253; H04W 4/027; H04W 4/021; G04B 47/00; G01C 17/00; H04B 1/385; H04B 5/00; G04G 21/04; G04G 21/02

USPC .................................. 455/556.1; 368/10, 13
See application file for complete search history.

(56) References Cited

U.S. PATENT DOCUMENTS

| 2009/0322513 | A1* | 12/2009 | Hwang | A61B 5/02055 340/539.12 |
| 2010/0267361 | A1* | 10/2010 | Sullivan | G01S 19/17 455/404.2 |
| 2014/0239065 | A1* | 8/2014 | Zhou | G06F 1/163 235/380 |

(Continued)

FOREIGN PATENT DOCUMENTS

| CN | 102209131 | 10/2011 | ............. H04M 1/02 |
| CN | 102866623 | 1/2013 | ............. G04G 19/00 |

(Continued)

OTHER PUBLICATIONS

International Search Report issued in application No. PCT/CN2014/074415, dated Jul. 9, 2015 (4 pgs).

*Primary Examiner* — Marcus Hammonds
(74) *Attorney, Agent, or Firm* — Hayes Soloway P.C.

(57) ABSTRACT

Provided is smart watch with a telephone function module and dial keys. Each dial key corresponds to an unchanged telephone number. After a Bluetooth connection between the smart watch and a primary mobile phone is established, both the smart watch and the primary mobile phone give a buzzing warning when the smart watch and the primary mobile phone detect that the Bluetooth connection is interrupted or a Bluetooth signal value is smaller than a set value. The smart watch is further provided with a temperature sensor, an acceleration sensor and a GPS module, and both the smart watch and the primary mobile phone give a buzzing warning if the sensors detect when change values of temperature and acceleration exceed preset values or if the geographical location of the smart watch is not within a set range.

20 Claims, 6 Drawing Sheets

(51) Int. Cl.
*G04G 21/02* (2010.01)
*G04G 21/04* (2013.01)
*G01C 17/00* (2006.01)
*G04B 47/00* (2006.01)
*H04B 1/3827* (2015.01)
*H04W 4/02* (2009.01)

(52) U.S. Cl.
CPC ............... *H04B 5/00* (2013.01); *H04W 4/021* (2013.01); *H04W 4/027* (2013.01)

(56) References Cited

U.S. PATENT DOCUMENTS

2015/0098309 A1* 4/2015 Adams ................ G04G 9/0064
368/10

FOREIGN PATENT DOCUMENTS

| CN | 103135440 | 6/2013 | ............. G04G 19/00 |
| CN | 103560815 | 2/2014 | ................ H04B 5/02 |

* cited by examiner

SMART WATCH

FIELD OF THE INVENTION

This present invention belongs to the field of wearable electronics.

BACKGROUND OF THE INVENTION

Current research and development of global wearable computing devices is very hot; Google glasses, the legendary Apple Watch, Samsung's smart watches, Google's wearable operating system, smart watches, and so on. Companies such as SONY and Casio also launched smart watches before, but all failed. A new generation of technology leaders company: Apple, Google, Samsung also have no mature product in market, at the time of this present invention application.

First, a key technical problem of Smart Watch, is how to achieve feasible function in a small volume size. At present, put all functions of smart phone or some functions of smart phone, into the size of a watch volume; the technical difficulty is very high. Google glasses also face big technical problems, because of volume size limitations. Now also no one knows the legendary Apple Watch, may has what killer function and applications.

Secondly, for adults, normal person, wearable computing devices, there is no killer function, can let wearable computing devices spread among the people.

Smart Watch of this present invention, have phone call function within a wristwatch size, can dial-up phone call, Safety protection, and health protection, cultivate good habits of children, and so on. The major killer function, is in children market, elderly market, patient market, and couples market.

Contents of the Invention

Technical problem to be solved by the present invention is insufficient for the above-mentioned prior art, it proposes a smart watch:

A Smart Watch, comprising wristwatch strap, wristwatch body, dial-up button on wristwatch body; the wristwatch body comprising top cover, main circuit, battery, bottom cover; the main circuit comprising telephone function module, microphone module, speaker module, CPU module, control circuit module, GPS module, storage module, short-distance wireless communication module, accelerometer sensor module, motor module, headphone jack module, joint mode, temperature sensor module;

Control circuit module, control turn on and turn off the other modules of the main circuit;

Smart Watch binding to one or more mobile phones, software on the binding mobile phones, send turn on and turn off each function module command to the control circuit module; then the control circuit module turn on or turn off the other function modules of the smart watch.

Wristwatch body has one or a plurality of dial-up buttons, each dial-up button dial a setting correspond telephone number. Press two dial-up buttons together, is timekeeping function, voice reporting the date, day of week, and time.

Smart Watch's power switch is set up on the backside of the bottom cover.

Abovementioned Smart Watch, when Smart watch binding a mobile phone, generate a corresponding comparison table. This correspond comparison table save in the Smart Watch and the mobile phone, or save in the server of telecommunication companies, or save in the server of Smart Watch companies. Smart Watch, mobile phone, and the server detect connect security, based on this correspond comparison table.

According to the different types of information, set different detect standards; Some types of information, sent directly without detect; Some types of information, detected by one of Smart Watch, the mobile phone, and the server; Some types of information, detected by two of Smart Watch, the mobile phone, and the server; Some types of information, detected by three of Smart Watch, the mobile phone, and the server.

Detect function module of Smart Watch, is in the control circuit module; Detect function module of mobile phone, is in smart watch application software within the mobile phone. Abovementioned Smart Watch, mobile phone through application software, send control information (operating instructions) to the binding Smart Watch: turn on or turn off short-distance wireless communication module; turn on or turn off GPS module; check GPS location information; turn on or turn off telephone function module; turn on microphone module and recording; turn on or turn off motor module, and send the instructions of vibration amplitude, vibration frequency, and vibration direction; adjust the volume of sound; check the smart watch battery power information; turn on or turn off accelerometer sensor module; turn on or turn off temperature sensor, check temperature information; turn on or turn off indicator light.

Smart Watch can send information to the binding mobile phone.

The information comprising: GPS location information; location information calculated based on the smart watch telephone function module signal; battery power information; microphone recording content information; accelerometer sensor information; motor vibration information, including vibration amplitude information, vibration frequency information, and vibration direction information; temperature sensor information.

Abovementioned Smart Watch, comprising temperature sensor, on the bottom cover or on the wristwatch strap. When the value of the temperature sensor exceeds the setting value, both Smart Watch and the binding mobile phone tweet will alarm.

Abovementioned Smart Watch, comprising indicator light; the binding mobile phone remotely control the indicator light, turn on or turn off.

Abovementioned Smart Watch, the short-distance wireless communication module, is Bluetooth. After Smart Watch and binding mobile phone set up a Bluetooth connection; if Smart Watch and binding mobile phone detect the Bluetooth connection is disconnected, or if Smart Watch and binding mobile phone detect the Bluetooth signal value less than setting value, both Smart Watch and the binding mobile phone tweet alarm.

If Smart Watch has a Bluetooth physical switch, when Smart Watch and binding mobile phone set up a Bluetooth connection, the Bluetooth physical switch automatically lose effectiveness; only when mobile phone send instruction of allow turn off Bluetooth, to Smart Watch, the Bluetooth physical switch can work. Or when mobile phone turn off its Bluetooth, and send the turn off information to Smart Watch, the Bluetooth physical switch can work. Abovementioned Smart Watch, Smart Watch real-time transmits its location information to mobile phone through GPS module. Mobile phone remotely view Smart Watch's current location. When Smart Watch's location outside the setting area, both Smart Watch and the binding mobile phone tweet alarm.

Abovementioned Smart Watch, comprising accelerometer sensor module, when the changing value of accelerometer sensor, exceed a setting value, both Smart Watch and the binding mobile phone tweet alarm.

Abovementioned Smart Watch, comprising triaxial gyroscope.

Abovementioned Smart Watch, does not have a screen, or comprising a black and white non-touch screen.

Smart Watch comprising solar module on the top cover, or on the wristwatch strap. Smart Watch comprising WiFi module, and has wireless hotspot function, transform Smart Watch telephone function module signal to WiFi signal.

Abovementioned Smart Watch, the motor module, accept the binding mobile phone's instructions, vibrating at a given frequency, given amplitude, and given direction. Or use Smart Watch itself vibration frequency information, vibration amplitude information, and vibration direction information, feedback and inversion control the binding mobile phone's motor, control mobile phone vibration frequency, vibration amplitude, and vibration direction.

Two binding Smart Watch, can feedback and control each other's motor, feedback and control each other vibration frequency, vibration amplitude, and vibration direction.

Compared with the prior art, the present invention has the following advantages:
1. Prevent or even eliminate child missing, and child abducted.
2. If children, elderly, and patient fall, or if they fever, family or doctor know immediately.

BRIEF DESCRIPTION OF DRAWINGS

For the skilled person in the field, from the following detailed description of drawings, can clearer understanding present invention, the abovementioned advantages will become more apparent, including.

BRIEF DESCRIPTION OF SYMBOLS

Figure 1:
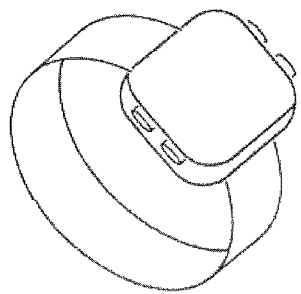
FIG. 1: Schematic view of the present invention Smart Watch

1. Wristwatch strap
2. Wristwatch body
3. Dial-up button
4. Bluetooth switch button
5. Timekeeping button
6. Temperature sensor
7. Power switch button
8. Indicator light which controlled by mobile phone
9. Smart Watch functional indicator light
10. Screen
11. Solar module
21. Top cover
22. Main circuit
23. Battery
24. Bottom cover
221. microphone module
222. telephone function module
223. speaker module
224. storage module
225. control circuit module
226. CPU module
227. GPS module
228. short-distance wireless communication module
229. accelerometer sensor module
230. motor module
231. joint mode
232. headphone jack module
1001-1006. Mobile phone remotely control Smart Watch procedures
2001-2006. Smart Watch send information to mobile phone procedures
3001-3013. Smart Watch and mobile phone, turn on and turn off Bluetooth procedures

DETAILED DESCRIPTION OF THE EMBODIMENTS

Figure 2:
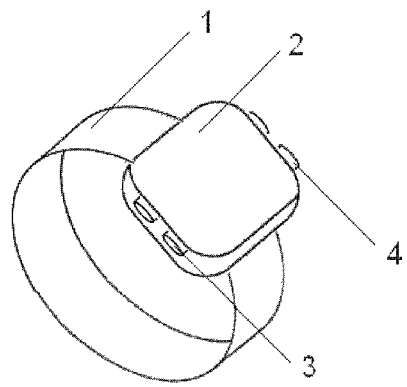
FIG. 2: Schematic structure of the present invention Smart Watch
Figure 3:
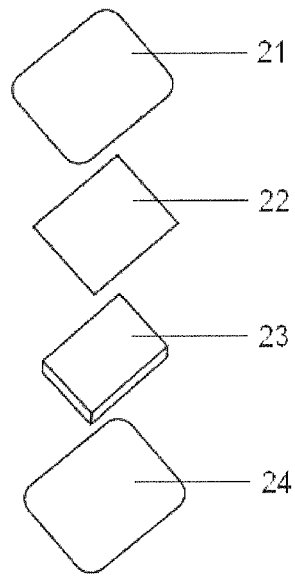
FIG. 3: Schematic structure of wristwatch body

FIG. 1 is a schematic view of Smart Watch. Smart Watch's schematic structure shown in FIG. 2, comprising wristwatch strap 1, wristwatch body 2, dial-up button 3 and dial-up button 4 on wristwatch body. FIG. 3 show schematic structure of wristwatch body 2, wristwatch body 2 comprising top cover 21, main circuit 22, battery 23, bottom cover 24. Dial-up button can set on the side of wristwatch body 2, as shown in FIG. 2; also can set on top cover 21; or can set on wristwatch strap 1. Battery 23 can be below the main circuit 22 as shown in FIG. 3, or can at the top of the main circuit 23, or can beside the main circuit 22.

Figure 4:
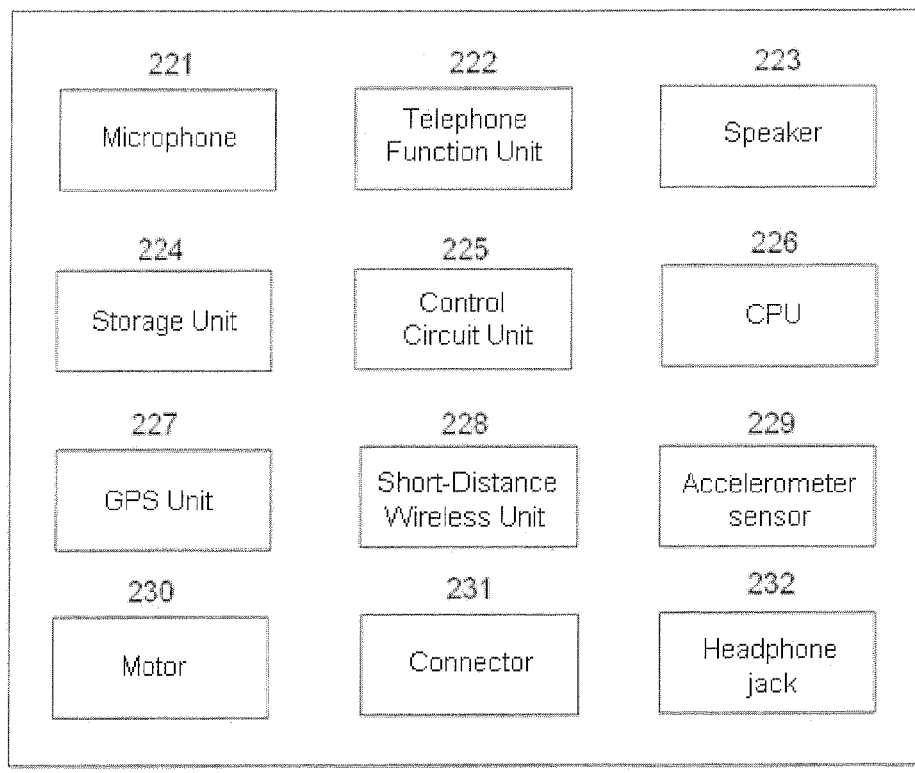
FIG. 4: Schematic structure diagram of the main circuit

Schematic structure diagram of the main circuit 22 shows in FIG. 4. Main circuit comprising telephone function module 222, microphone module 221, speaker module 223, CPU module 226, control circuit module 225, GPS module 227, storage module 224, short-distance wireless communication module 228, accelerometer sensor module 229, motor module 230, headphone jack module 232, joint mode 231.

Telephone function module 222, is a mobile phone communication circuit module, it can be any mobile phone communication circuit. Such as GSM, PHS, EDGE, WCDMA, CDMA, TDMA, LTE, Wi-Max, 2G, 3G, 3.5G, 4G, 5G, and so on. Telephone function module 222, includes a phone card slot, you can put the phone card. Or in order to save space, directly built-in telephone function circuit modules, no need a phone card.

The control circuit module 225, control the other modules of main circuit 22, turn on or turn off The control circuit module 225, is connected to the other modules; there is a "ON signal" and "OFF signal" line, connected to switch circuit of other modules' power supply circuit, supply voltage line or supply current line. The control circuit module 225, issue turn on or turn off electrical signal to the each other functional modules; control circuit module output the "ON signal" or "OFF signal", to switch circuit of other functional modules' power supply circuit, turn on or turn off each functional modules' power supply line; thus achieving turn on and turn off the function of each functional module.

Smart Watch of this invention, and the binding mobile phone, together achieve some functions. Application software in the binding mobile phone, send operating instructions to control circuit module 225 in Smart Watch, turn on or turn off instruction to each functional modules; and the control circuit module 225 implement the turn on and turn off operation. The binding mobile phone also can called main mobile phone.

Smart Watch binding to one or a plurality of mobile phones. For example parents use their identity ID card, apply Smart Watch's phone number from telecom companies, and binding the Smart Watch's phone number and their own mobile phone's phone number. On the side of Smart Watch's wristwatch body, have one or a plurality of dial-up buttons. It is somewhat similar to traditional watch's adjust time button. The dial-up buttons of this invention, also has the function of adjust time. But the main function of the dial-up buttons on side of wristwatch body, is dial-up and receive phone calls. Press each dial-up button, dial-up a setting telephone number, normally is dial-up the binding mobile phone's phone number.

Parents buy the Smart Watch of this present invention to their children, wearing on child's wrist. Parents can configure each dial-up key correspond telephone number. For example, the first dial-up key is dial to child's father, the second dial-up key is dial to child's mother, and the third dial-up key is dial to child's grandparents or maternal grandparents.

And the child's Smart Watch's phone number, only parents know, other people do not know, it is safe for children. This is especially suitable for children under 7 years of age, stage of kindergarten children. Many parents want communication with children, but if buy a mobile phone to children, they will worry about too early use mobile phone may has bad impact to children. Smart Watch of this invention, wear on children's wrist, very suitable for children. And it only can call families. Families call to child, Smart Watch can set each incoming call different ring tone, each ring tone corresponds to a family number. Such as father's phone ring tone is A, mother's phone ring tone is B, grandparents' of ring tone is C. Phone ring tone can be set directly to parents' voices, children can know who is caller according to the phone ring tone. When different incoming call, child press the corresponding dial-up key, answer the call. Or set all incoming calls, no matter which dial-up key, all can answer the call. For children, it is very simple and easy to use. Of course, also can be set to when incoming call, Smart Watch vibrate to remind; or set to when incoming call, Smart Watch indicator light flashing to remind.

Binding a Smart Watch and a mobile phone, have several methods. One method is, user bring identity ID card to telecom companies, telecom companies input binding mobile phone numbers, to the phone card of Smart Watch; or write binding mobile phone numbers, to the telephone function circuit of Smart Watch. Each dial-up button of Smart Watch, correspond to a telephone number in the phone card or the telephone function circuit; and inform user the corresponding sequence.

One method is, telecom companies or Smart Watch service providers, set each dial-up button of Smart Watch, dial a fixed setting short phone number. And user set each short phone number corresponding telephone number. For example, some telecom companies will provide family kinship network business, every family member's phone number is assigned to a short phone number.

One method is, telecom companies or Smart Watch service providers, provide a server, parents can use a user name and password login into server webpage, set each dial-up button of Smart Watch, correspond to which telephone number.

One method is, Smart Watch has a cable to connect to parent's mobile phone, or computer. In the application software on the parent's mobile phone or computer, set each dial-up button of Smart Watch, correspond to which telephone number.

When a Smart Watch binding a mobile phone, generate a binding correspond comparison table. This binding correspond comparison table save in three place: the Smart Watch, the mobile phone, and the server of telecom company, or the server of Smart Watch company. Smart Watch, mobile phone, and the server detect connection security, based on this binding correspond comparison table.

Figure 10:
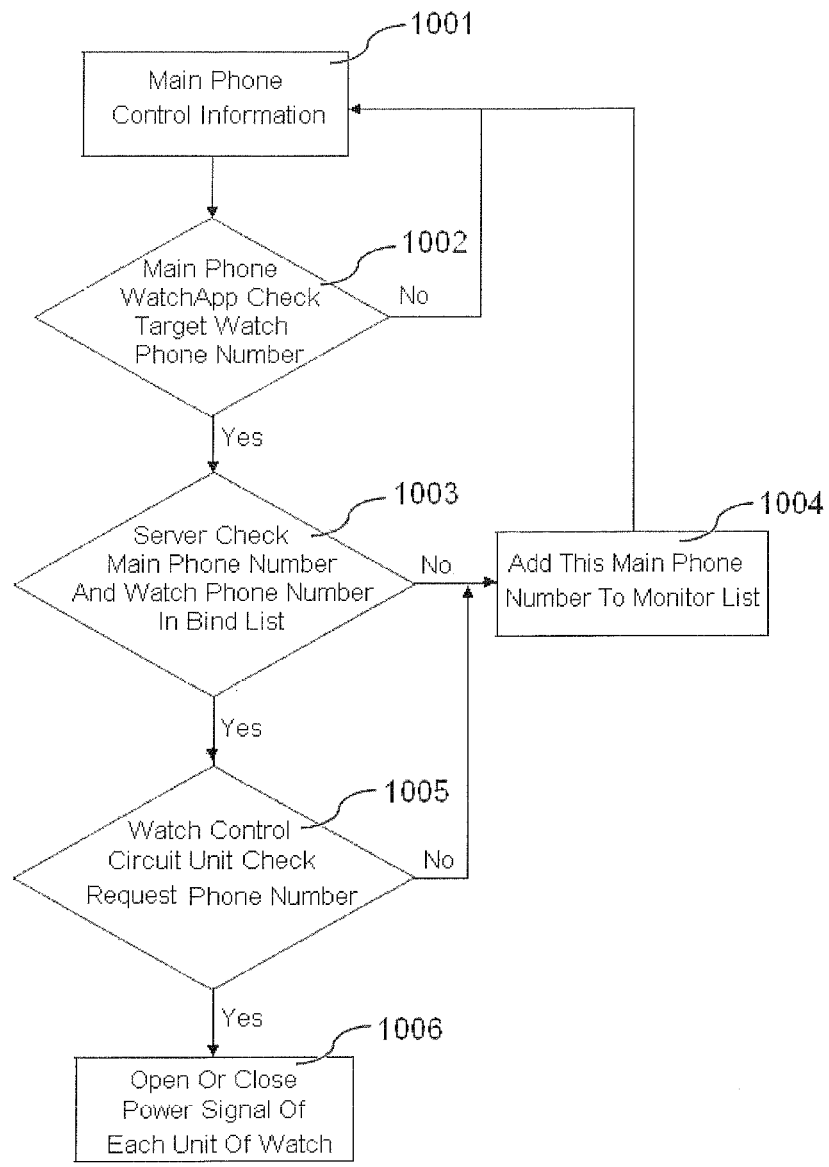
FIG. 10: Mobile phone remotely control Smart Watch procedures

Smart Watch, mobile phone, and the server all comprising detect function module, monitoring connection security between Smart Watch and the binding mobile phone. Detect function module of Smart Watch, is in the control circuit module 225. Detect function module of mobile phone, is in smart watch application software within the mobile phone. The binding mobile phone, can remotely control Smart Watch, the control procedures as shown in FIG. 10.

Procedure 1001, application software of the binding mobile phone, send control information (operating instructions) to the binding Smart Watch.

Procedure 1002, application software of the binding mobile phone, detect if the target Smart Watch's phone number, is the binding phone number with mobile phone's phone number. If it is, continues to send operation instruction. If it is not, then don't send operation instruction, return to step 1001.

Detect function also can be set up on the server of telecom company or Smart Watch company. As shown in procedure 1003, when mobile phone's control information (operating instructions) arrive the server, the server will detect if the instruction sender's phone number, and instruction receiver's phone number, has a binding relationship; if sender's phone number and receiver's phone number, are in binding correspond comparison table. If both sides phone number, has a binding record in the server, then the server will send the control instruction to Smart Watch. If both sides phone number, don't have a binding record in the server, then the server will refuse to send control instruction to Smart Watch; and the server will add this instruction sender's phone number to monitor list, as shown in step 1004. And the server system will timely notify this warning information to manual processing.

At step 1003, the server can also request the binding mobile phone enter password to verify. When user buy Smart Watch, or when user set the binding mobile phone, they will get a user name and password, through they identification.

When Smart Watch's control circuit module 225, receive the control information of mobile phone, as shown in procedure 1005. First detect the sender mobile phone number, if it is binding mobile phone number. If it is, then accept the operation instruction, if it is not, don't accept the operation instruction.

Next is procedure 1006, if Smart Watch accept the operation instruction, control circuit module 225 will perform the operation instruction, turn on or turn off the power supply of other function modules on the main circuit.

Figure 11:
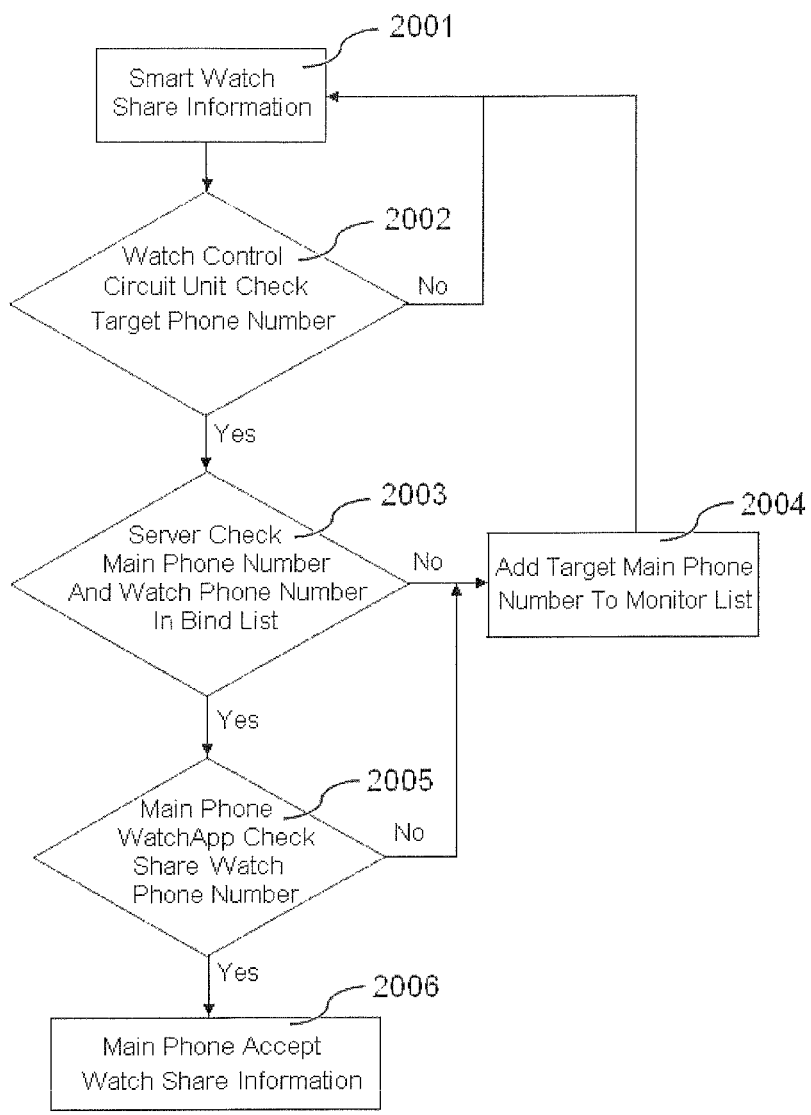
FIG. 11: Smart Watch send information to mobile phone procedures

Above mentioned three detection of mobile phone, Smart Watch, and the server. If only one detect, called simple detection, if two detect, called double detection, if three detect, called triple detection. The three detection is bidirectional. FIG. 11 is the return direction, procedures of Smart Watch send informations to the binding mobile phone.

Procedure 2001, Smart Watch prepare to send information. Procedure 2002, Smart Watch's control circuit module 225, detect if the target mobile phone's phone number, is the binding mobile phone's phone number. If it is, continues to send information. If it is not, then don't send information.

When the server receives the information sent by the Smart Watch, as shown in procedure 2003. The server will detect if the instruction sender's phone number, and instruction receiver's phone number, has a binding relationship; if sender's phone number and receiver's phone number, are in binding correspond comparison table. If both sides phone number, has a binding record in the server, then the server will send Smart Watch's information to the binding mobile phone. If both sides phone number, don't have a binding record in the server, then the server will refuse to send Smart Watch's information to the binding mobile phone; and the server will add this information receiver's phone number to monitor list, as shown in step 2004.

Procedure 2005, when binding mobile phone receives information, application software of the binding mobile phone, detect if the sender Smart Watch's phone number, is the binding phone number with mobile phone's phone number. If it is, accept the information. If it is not, then don't accept the information.

When implement this invention, can choose simple detection, double detection, and triple detection, according to cost. At least one kind of detection. The most security is triple detection.

Bidirectional detect sending content, include but are not limited to, the control information that binding mobile phone send to Smart Watch: turn on or turn off short-distance wireless communication module 228; turn on or turn off GPS module 227; check GPS location information; turn on or turn off telephone function module 222; turn on microphone module 221, and recording; turn on or turn off motor module 230, and send the instructions of vibration amplitude, vibration frequency, and vibration direction; adjust the volume of sound; check the Smart Watch battery power information; turn on or turn off accelerometer sensor module 229; turn on or turn off temperature sensor 6, check temperature information; turn on or turn off indicator light 8; Smart Watch Bluetooth link object.

Bidirectional detect sending content, include but are not limited to, the information that Smart Watch send to binding Mobile phone:

GPS location information; location information calculated base on the smart watch telephone function module signal; battery power information; microphone recording content information; accelerometer sensor information; motor vibration information, including vibration amplitude information, vibration frequency information, and vibration direction information; temperature sensor information.

Figure 5:
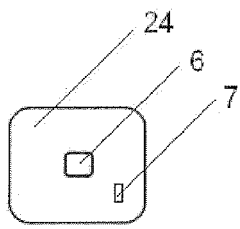
FIG. 5: Schematic diagram of bottom cover

As shown in FIG. 5, on the back side of the bottom cover 24, the side that turn off to human body skin, have a temperature sensor 6, and a power switch 7. Temperature sensor 6, also can be on the inner side of the wristwatch strap, the side that turn off to human body skin.

When the temperature sensor 6, detect people who wear Smart Watch, if his body temperature exceeds human body's normal temperature range, both Smart Watch and the binding mobile phone tweet alarm.

So, if children, elderly, or patient's body temperature exceed normal body temperature range, both Smart Watch and the binding mobile phone tweet alarm. Let family members, or doctors and nurses, can immediately know, and take measures in time.

Smart Watch has temperature sensor 6, if wear Smart Watch are women, it can calculate out menstrual cycle, according to the daily temperature information.

Smart Watch's power switch 7, set up on the back side of bottom cover 24, there are several advantages. Because can not reach, so children will not mistake touch, mistake shut down. Power switch 7 is not raised button switch, but is toggle switch in a groove, or needle poke type switch. Toggle switch or a needle poke switch, make sure that there is no mistake operation.

If it is not the parents themselves, but other people trying to take away children's Smart Watch, or trying to shut down Smart Watch; must first remove children's Smart Watch, and when Watch removed, temperature sensor will trigger both Smart Watch and the binding mobile phone tweet alarm.

For efficiency and convenience, above mentioned three detect, will set different detect standard according to different types of information. Some types of information, sent directly without detect; some types of information, require simple detection; some types of information, require double detection; some types of information, require triple detection.

For example, if temperature sensor value exceeds a setting value range, or the changing value of the accelerometer sensor exceeds a setting value, sent directly without detect two sides telephone numbers.

For example, check or send Smart Watch's battery power information, require simple detection.

For example, send GPS location information, turn on the microphone and recording requires double detection.

For example, turn on or turn off short-distance wireless communication module 228, turn on or turn off temperature sensor 6, turn on or turn off acceleration sensor module 229, require triple detection.

Figure 6:
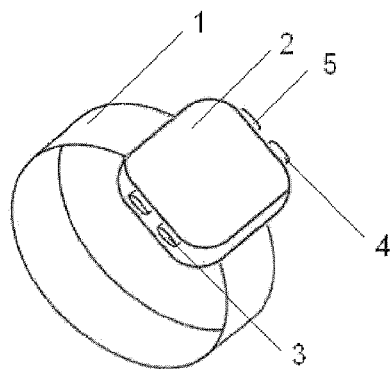
FIG. 6: Timekeeping function key

Smart Watch of this present invention has a timekeeping function, as shown in FIG. 6, there is a timekeeping button 5, on the side of wristwatch body. Press the button 5, Smart Watch automatic report time by voice through speaker. Double-click the button 5, or long press the button 5, Smart Watch automatic report the date and day of the week by voice through speaker.

Time Source of timekeeping function have three. One is from the clock circuit on the main circuit 22 of Smart Watch, usually a quartz circuit. One is from the binding mobile phone's time information; when user presses the timekeeping button 5, Smart Watch send a time request to the binding mobile phone, and the binding mobile phone return time value to Smart Watch. One is from the server of telecom company or Smart Watch company, when user presses the timekeeping button 5, Smart Watch send a time request to the server, server return time value to Smart Watch.

In order to save button, independent timekeeping button 5 is not necessary; it can share with the dial-up button 3. When press two dial-up buttons together, automatic report time by voice through speaker. When press another two dial-up buttons together, automatic report the date and day of the week by voice through speaker.

Then dial-up button can be set to each button has different color, it will help children differentiate and memory.

The timekeeping function can also be set to every hour, Smart Watch automatic report time by voice through speaker, or automatic vibration report.

Figure 7:
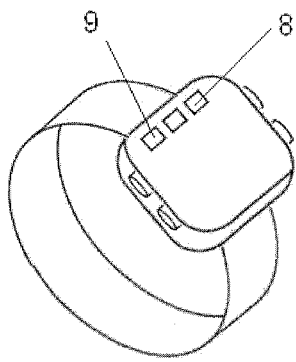
FIG. 7: Indicator light on top cover

As shown in FIG. 7, on the top cover 21 of wristwatch body 2, set up indicator light. There are two kinds of indicator light. One is indicator light 8, it is controlled by the binding mobile phone, Smart Watch itself can't turn on light or shut down light. One is indicator light 9, it is Smart Watch's functional indicator light. For example, Smart Watch's battery power indicator light, when battery power is over a setting value, it is green light; when battery power is between two setting values, it is yellow light; when battery power is less than a setting value, it is red light or flashing red light. Another indicator light 9 sample, is user press the record button to start recording, there is a recording indicator color light. Indicator light 8 and indicator light 9, also can be set up on the wristwatch strap.

The following is an embodiment of indicator light 8. Parents can control indicator light 8 on child's Smart Watch, through application software on parents binding mobile phone, or through the server of telecom company or Smart Watch company. Parents also can configure allow another mobile phone to control indicator light 8 on child's Smart Watch, through application software on parents binding mobile phone, or through the server of telecom company or Smart Watch company. For example, Smart Watch have two indicator light 8, one is pink light, one is green light. Pink light is controlled by child's parents mobile phone; green light is controlled by child's teacher, who are configured allowably by parents.

For example, many children don't eat on time, don't sleep on time, and so on. Parents turn on pink light, if child is well-behaved at home. So, child go to kindergarten the next day, if other children's Smart Watch all beaming pink light, but his pink light is dark. And other children and the teacher all see the dark indicator light. Then, children will have motion to performance good at home, parents will be very happy.

If the child is doing well in kindergarten, the teacher turn on green light; if the child is not doing well in school, the teacher shut down green light. Then, when child back to home from school, parents immediately know child's performance in school during the day. Children will compare with each other two lights, pink light and green light every day, it will positively promote children well-behaved no matter at home or at school.

Smart Watch of this present invention, comprising short-distance wireless communication module 228, is a wireless communication technology. The wireless communication technology, comprising Bluetooth, WiFi, ultrasonic wave, radio frequency, and so on. Usually is Bluetooth.

When the distance between Smart Watch and the binding mobile phone, over Bluetooth receiver distance, that can not detect binding target's Bluetooth signal, both Smart Watch and the binding mobile phone tweet alarm. Or when Smart Watch's Bluetooth switch is turn off, both Smart Watch and the binding mobile phone tweet alarm.

Such as parents take their children to shopping malls, supermarkets, parks; railway stations, bus stations and other public places; when the child's Smart Watch Bluetooth signal, and parents mobile phone's Bluetooth signal, can't detect each other's signal; both Smart Watch and the binding mobile phone tweet alarm. Thus if the distance between parents and children, over Bluetooth receive distance, both Smart Watch and the binding mobile phone tweet alarm. Thus avoiding the risk of the child wander missing. Greatly reducing parents psychological burden, when they go out with child. And it can prevent Child trafficking.

Smart Watch can have no physical Bluetooth switch. The binding mobile phone, send turn on or turn off short-distance wireless communication module command, to control circuit module 225 of Smart Watch.

Smart Watch's Bluetooth only can adapter with several binding mobile phone, and can not adapter to other Bluetooth devices.

Smart Watch also can have physical Bluetooth switch 4, on the side of wristwatch body. Physical Bluetooth switch 4, also can share one key with GPS switch, called Bluetooth/GPS switch; press once, turn on Bluetooth and turn off GPS; press once again, turn off Bluetooth and turn on GPS.

Figure 12:
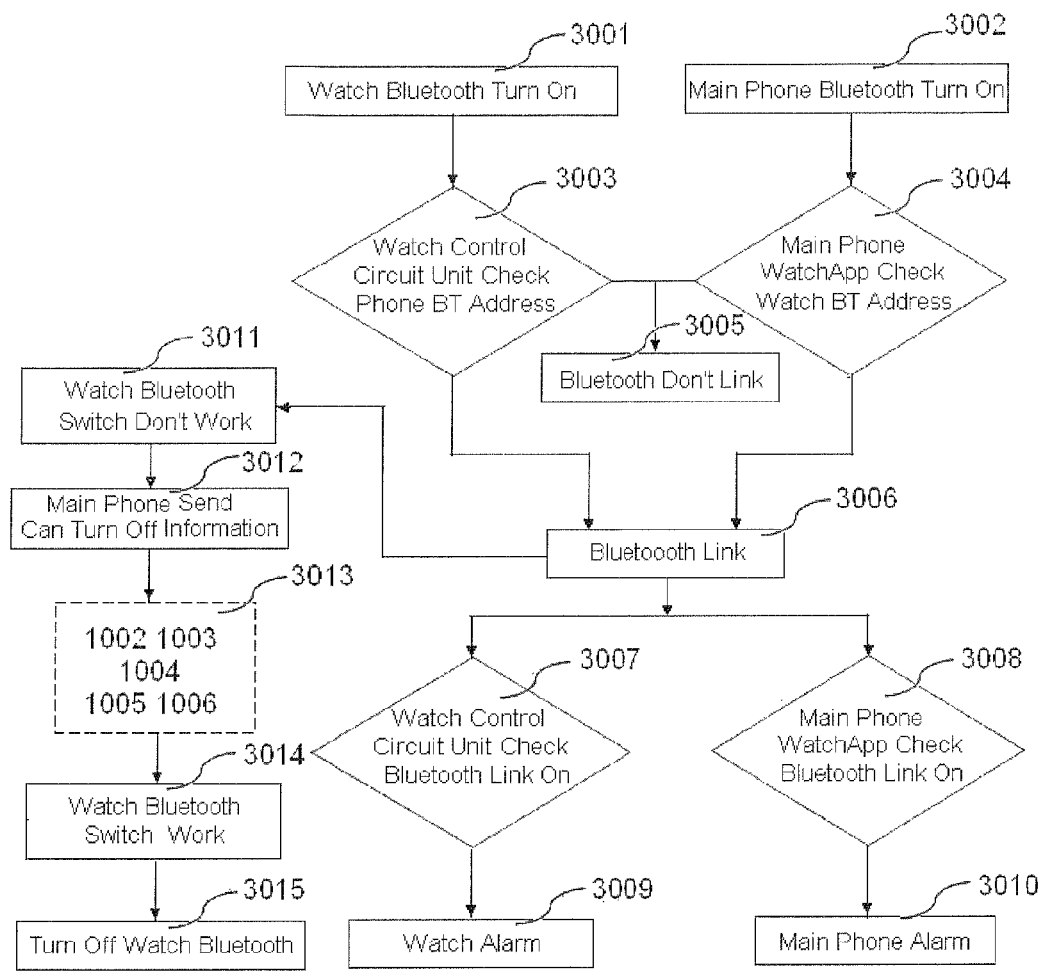
FIG. 12: Smart Watch and mobile phone, turn on and turn off Bluetooth procedures

When using Bluetooth physical switch 4, Smart Watch and binding mobile phone, Bluetooth turn on and turn off, as shown in FIG. 12.

Procedure 3001, Smart Watch turn on Bluetooth physical switch; procedure 3002, binding mobile phone turn on Bluetooth.

Procedure 3003, the control circuit module 225 of Smart Watch, detect binding mobile phone's Bluetooth address, if it is the binding address; if it is not, then the Bluetooth don't link (procedure 3005).

Procedure 3004, application software in mobile phone, detect binding Smart Watch's Bluetooth address, if it is the binding address; if it is not, then the Bluetooth don't link (procedure 3005).

Only Smart Watch and binding mobile phone, verify each other's Bluetooth address is correct, then set up a Bluetooth link, as shown in procedure 3006.

After Smart Watch and binding mobile phone set up a Bluetooth link, the control circuit module of Smart Watch, will detecting the Bluetooth link, as shown in procedure 3007. If the control circuit detect Bluetooth link disconnect, or detect Bluetooth signal value is less than a setting value, then Smart Watch tweet alarm, as shown in procedure 3009.

After Smart Watch and binding mobile phone set up a Bluetooth link, application software in mobile phone, will detecting the Bluetooth link, as shown in procedure 3008. If the application software detect Bluetooth link disconnect, or detect Bluetooth signal value is less than a setting value, then the binding mobile phone tweet alarm, as shown in procedure 3010.

When Smart Watch and binding mobile phone set up a Bluetooth link at step 3006, the physical Bluetooth switch of Smart Watch, automatically lose effectiveness, as shown in procedure 3011.

Only when the binding mobile phone send allow turn off command to Smart Watch, as shown in procedure 3012; the physical Bluetooth switch can work.

After procedure 3012, is procedure 3013. Procedure 3013 is the step 1002 to step 1006 in FIG. 10, verify the allow turn off command, that the binding mobile phone send to Smart Watch. Then, enter step 3014, the physical Bluetooth switch can work. Step 3015, press the physical Bluetooth switch, turn off Smart Watch's Bluetooth.

It means, the control circuit module don't allow first turn off Smart Watch's Bluetooth, then turn off mobile phone's Bluetooth. It must be mobile phone first turn off Bluetooth link, in application software. Then, Smart Watch's physical Bluetooth switch can work, otherwise can't work. Control circuit module will detect, only when the binding mobile phone turn off Bluetooth link, and send turn off Bluetooth link information to Smart Watch; Smart Watch's physical Bluetooth switch can work. When control circuit module does not receive mobile phone turn off Bluetooth link information, if physical Bluetooth switch is touched, both Smart Watch and the binding mobile phone tweet alarm. And in this condition, the alarm level much more high. This effectively prevents criminals trying to turn off child Smart Watch's Bluetooth switch.

Smart Watch of this present invention, GPS module default setting is has no physical GPS switch; fully remote controlled by the binding mobile phone.

If Smart Watch has a physical GPS switch, will be the same as above mentioned physical Bluetooth switch. It is not allowed to turn off Smart Watch GPS module first. Only when the binding mobile phone, send allow turn off GPS module command, to control circuit module of Smart Watch, then the physical GPS switch can work.

Of course, in addition to prevent children wandered off, prevent trafficking; these functions are also very suitable for the elderly and special patient. Smart Watch of this present invention, can change size, shape, and form; it can be a pet collar, prevent animal pet wandered off.

Smart Watch can send real-time geographical location information to binding mobile phone, through GPS module 227. On watch application software, the binding mobile phone user can real-time check and view Smart Watch user's location information on the map; can check and view movement on the map. And also can view by date, view by time, and view various statistical information of Smart Watch user's movement on the map.

Smart Watch of this present invention, has long-distance protect function, long-distance location alarm function. If Smart Watch's location is out of a setting area, both Smart Watch and the binding mobile phone tweet alarm. The binding mobile phone user can set on watch application software, set security area on map, if Smart Watch user out of this security area, both Smart Watch and the binding mobile phone tweet alarm.

The long-distance protect function also can called electronic fence, or electronic fence function, or electronic fence protect function.

For example, children go to kindergarten or primary school, the usual route is home, on the road from home to school, school, this is a certain range. First of all, parents can remotely view children geographical location. Secondly, parents can set, if Smart Watch location out of school area, both Smart Watch and the binding mobile phone tweet alarm. When parents not stay with children, this long-distance protect function, will prevent trafficking.

Smart Watch of this present invention, comprising accelerometer sensor module 229, if the changing value of accelerometer sensor, exceed a setting value, both Smart Watch and the binding mobile phone tweet alarm.

So if wearing a Smart Watch, children, elderly, patients suddenly occur big movement, such as falls, fights, etc., family members or doctors and nurses, can immediately know, and take measures in time.

When children violent shaking arm, to resist criminals; the accelerometer sensor trigger Smart Watch tweet alarm, warning criminals and scare away criminals. Parents mobile phone tweet alarm at the same time, so parents know the situation right away. Parents also can remotely turn on microphone module 221 and recording; if children real in danger, can call the police immediately, and send children Smart Watch GPS location to the police.

Smart Watch of this present invention, also can include a recording button. Can also comprising headphone jack module 232. So children can recording important content of teacher in school, and review at home. Children can listen and review the recording content, directly on the Smart Watch; also can upload the recording content to binding mobile phone, or a computer to review, save archiving, edit, and so on.

Of course, you can also download file or music, from Internet, or from binding mobile phone, or from a computer, to the storage module 224 of Smart Watch; and then listen to music through Smart Watch.

Smart Watch of this present invention, have short-distance wireless communication protection, geographical position middle distance and long distance protection, temperature sensor protection, accelerometer sensor protection, remote recording protection, direct dial-up call protection. Parents can ensure children's safety. short-distance wireless communication protection can be Bluetooth. Geographical position middle distance and long distance protection, it can base on GPS; or it can calculated base on the Smart Watch telephone function module signal, according to telecom companies base station.

Because Smart Watch's power switch is set up on the backside of the bottom cover, so if other people except the bing mobile phone user, try to shun down Smart Watch, he must remove the Smart Watch first. When the people trying to remove Smart Watch, abovementioned temperature sensor and accelerometer sensor, will all trigger both Smart Watch and the binding mobile phone tweet alarm.

The control circuit module 225 can also set automatically run a program under certain conditions. For example, when it is detected Smart Watch short-distance wireless communication is turn off, or short-distance wireless communication signal value less than setting value, automatically turn on microphone, and recording a setting time, such as automatic recording 2 minutes; and automatically report the geographical location. Smart Watch of this present invention, default settings is no screen, so it very save power. A variety of electronic terminal devices on the market, the touch screen cost half of whole equipment power consumption. For example, a Smart Watch with equipped a touch screen, the touch screen's power consumption is the half of the whole Smart Watch's power consumption.

Figure 9:
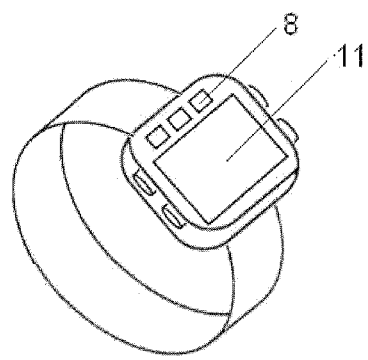
FIG. 9: Smart Watch comprising solar module

Smart Watch of this present invention, also can comprising a solar module, charge the battery, supply for Smart Watch. As shown in FIG. 9, solar module 11, set up on the top cover 21. Of course, the solar module 11 also can set up on the wristwatch strap.

Figure 8:
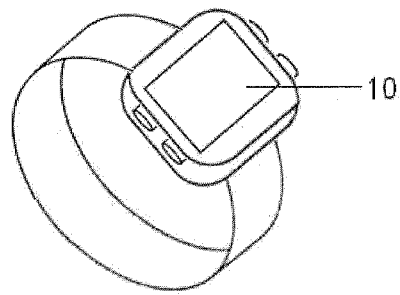
FIG. 8: Smart Watch comprising a screen

Smart Watch of this present invention, also can comprising a screen 10, as shown in FIG. 8. Screen 10 can be a non-touch screen in black and white, like the black and white screen that used on early electronic watches. Screen 10 also can be e-ink screen. Screen 10 also can be color screen and a color touch screen.

Smart Watch of this present invention, also can comprising triaxial gyroscope, record all kinds of sports information of wearing Smart Watch user.

Smart Watch of this present invention, also can comprising WiFi module, and has wireless hotspot function, transform Smart Watch telephone function module signal to WiFi signal. Thus, if the Smart Watch telephone function module is 3G, 4G, 5G and other high-speed telecom technologies, Smart Watch can convert 3G, 4G, 5G signal to WiFi signal for user's other electronic devices, such as user's mobile phones, tablet PCs, notebook computers, all-in-one computer or desktop computers.

Motor module 230, of the present invention Smart Watch, can accept the binding mobile phone's instructions, vibrating at a given frequency, given amplitude, and given direction. Or use Smart Watch itself vibration frequency information, vibration amplitude information, and vibration direction information, feedback and inversion control the binding mobile phone's motor, control mobile phone vibration frequency, vibration amplitude, and vibration direction.

Two binding Smart Watch, can feedback and control each other's motor, feedback and control each other vibration frequency, vibration amplitude, and vibration direction. Specific layout, mode, operation, according to the idea of this present invention, are within the scope of protection of this present invention. Replacement and transposition of the abovementioned examples' location, quantity, type etc.; are within the scope of protection of this present invention.

Such as, put dial-up button 3 on the top cover, or on the wristwatch strap. Such as, each function module 221 to 232, of the main circuit 22, all put on a PCB circuit board; or most of them put on a main PCB circuit board, several other function module put on one or more deputy PCB circuit boards. Each function module 221 to 232, of the main circuit 22, each function module can be single circuit or a single chip, or several function modules integrated in a chip. For example, short-range wireless communication module 228 and the GPS module 227 integrated on a chip. Such as, one chip provided Bluetooth function, GPS function, and WiFi function. Such as, all kinds of sensors, temperature sensor, accelerometer sensor integrated on a chip. Such as control circuit module 225, and CPU module 226 integrated on a chip.

Each function module 221 to 232, of the main circuit 22, can also reduce one or more modules according to the situation. Such as no GPS module, such as no storage module, such as no temperature sensor module, etc.

Joint mode 231, providing connected to a power supply charging, or provide Smart Watch connect to the binding mobile phones or a computers for a variety of settings. Joint is usually a kind of USB connector.

Smart Watch also can wireless charging.

Those skilled in this field can understand: the above description is only a preferred embodiment of the present invention, but not to limit the present invention. For the skilled technicians, can modify the technical solutions, or replacement some technical features. Any modification within the spirit and principles of this present invention, are within the scope of protection of this present invention.

The invention claimed is:

1. A Smart Watch, having wristwatch strap, a wristwatch body comprising a top cover, a main circuit, a battery, and a bottom cover;
    wherein the main circuit comprises a telephone function module, a microphone module, a recording module, a speaker module, a CPU module, a control circuit module, a GPS module, a storage module, a short-distance wireless communication module, an accelerometer sensor module, a motor module, a headphone jack module, a joint mode, and a temperature sensor module;
    wherein the Smart Watch connects to one or a plurality of mobile phones;
    wherein the wristwatch body also comprises one or a plurality of dial-up buttons, each dial-up button being adapted to dial a correspond telephone number; wherein:
    when short-distance wireless communication is turned off, or a short-distance wireless communication signal value is less than a set value, the Smart Watch tweets an alarm;
    when the Smart Watch's geographical location is out of a set area, the Smart Watch tweets an alarm;
    when the Smart Watch's accelerometer senses a value exceeding a set value, the Smart Watch tweets an alarm; and
    when the Smart Watch's temperature sensor senses a value exceeding a set value range, the Smart Watch tweets an alarm.

2. The Smart Watch according to claim 1, wherein when the Smart Watch connects to a mobile phone, the phone and the Smart Watch generate a correspond comparison table; the correspond comparison table is saved in the Smart Watch and the mobile phone, or saved in a server of a telecommunication company, or saved in a server of a Smart Watch company, and the Smart Watch, the mobile phone, and the server detect a connect security, based on the correspond comparison table;
    wherein according to different types of information, different detect standards are set; wherein some types of information are sent directly without detection; some types of information are detected by one of the Smart Watch, the mobile phone, and the server; some types of information are detected by two of the Smart Watch, the mobile phone, and the server;
    and some types of information are detected by three of Smart Watch, the mobile phone, and the server;
    wherein a detection function module of the Smart Watch is in the control circuit module; and
    wherein a detection function module of the mobile phone is in Smart Watch application software within the mobile phone.

3. The Smart Watch according to claim 1, wherein the mobile phone includes application software adapted to send control information to the Smart Watch to:
    turn on or turn off the short-distance wireless communication module;
    turn on or turn off the GPS module;
    check GPS location information;
    turn on or turn off the telephone function module;
    turn on the microphone module and recording module;
    turn on or turn off the motor module, and
    send instructions for vibration amplitude, for vibration frequency, and for vibration direction; and
    for adjusting sound volume;
    for checking Smart Watch battery power;
    for turning on or turning off the accelerometer sensor module;
    for turning on or turning off the temperature sensor;
    for checking temperature information; or
    for sending information to a connected mobile phone;
    the information comprising: GPS location information; calculated location information based on the Smart Watch telephone function module signal; battery power information; microphone recording content information; accelerometer sensor information; motor vibration information, including vibration amplitude information, vibration frequency information, and vibration direction information; and temperature sensor information.

4. The Smart Watch according to claim 1, wherein the temperature sensor is on the bottom cover or on the wristwatch strap; and when the the temperature sensor senses a value which exceeds a set value, both the Smart Watch and the connected mobile phone tweet alarms.

5. The Smart Watch according to claim 1, further comprising at least one or a plurality of indicator lights which can be remotely controlled by the mobile phone.

6. The Smart Watch according to claim 1, wherein the short-distance wireless communication module comprises a Bluetooth module, wherein after the Smart Watch and a connected mobile phone set up a Bluetooth connection, or the Smart Watch and connected mobile phone detect a Bluetooth connection is disconnected, or if the Smart Watch and connected mobile phone detect a Bluetooth signal value less than a set value, both the Smart Watch and the connected mobile phone tweet an alarm;
    wherein when Smart Watch has a Bluetooth physical switch, when Smart Watch and connected mobile phone set up a Bluetooth connection, the Bluetooth physical switch automatically loses effectiveness;

wherein when the mobile phone sends instructions to the Smart Watch which allow the Bluetooth to be turned off, the Bluetooth physical switch works;

and wherein when the mobile phone turns off its Bluetooth, and sends the turn off information to the Smart Watch, the Bluetooth physical switch works.

7. The Smart Watch according to claim 1, wherein the Smart Watch is adapted to transmit its geographical location information in real-time to the mobile phone through the GPS module, and the mobile phone remotely views the Smart Watch's current location, when the Smart Watch's geographical location is outside a set area, both the Smart Watch and the connected mobile phone tweet an alarm.

8. The Smart Watch according to claim 1, wherein when a changing value of the accelerometer sensor exceeds a set value, both the Smart Watch and the connected mobile phone tweet an alarm.

9. The Smart Watch according to claim 1, wherein the Smart Watch is without a screen, or comprises a black and white non-touch screen, or an e-ink screen, or a color screen, or a color touch screen.

10. The Smart Watch according to claim 1, wherein the motor module is adapted to accept a connected mobile phone's instructions to vibrate at a given frequency, a given amplitude, and a given direction;

or to use the Smart Watch's vibration frequency information, vibration amplitude information, and vibration direction information, to feedback and control the connected mobile phone's motor, to control the mobile phone vibration frequency, vibration amplitude, and vibration direction;

or two connected Smart Watches, feedback and control each other's motors, or feedback and control each other vibration frequencies, vibration amplitudes, and vibration directions.

11. The Smart Watch according to claim 1, wherein the control circuit module is adapted to control turn on and turn off other modules of the main circuit;

software on the connected mobile phones, sends turn on and turn off each function module command to the control circuit module; and the control circuit module turns on or turns off the other function modules of the Smart Watch.

12. The Smart Watch according to claim 1, wherein the Smart Watch comprises a timekeeping button, wherein when the timekeeping button is pressed, the Smart Watch automatically reports time by voice through a speaker, the voice reporting time, date, and day of week;

or when two dial-up buttons are pressed together, the voice reports time, date, and day of week.

13. The Smart Watch according to claim 1, wherein the Smart Watch's power switch is on a backside of the bottom cover.

14. The Smart Watch according to claim 1, wherein the Smart Watch further comprises a triaxial gyroscope.

15. The Smart Watch according to claim 1, wherein the Smart Watch further comprises a solar module on the top cover, or on a wristwatch strap.

16. The Smart Watch according to claim 1, wherein the Smart Watch further comprises a WiFi module having wireless hotspot function, which transforms the Smart Watch telephone function module signal to a WiFi signal.

17. The Smart Watch according to claim 1, wherein the control circuit module is connected to other functional modules, and a "ON signal" and "OFF signal" line is connected to switch circuits of other said modules' power supply circuit(s).

18. The Smart Watch according to claim 1, wherein the short-distance wireless communication module comprises a wireless communication technology, the wireless communication technology comprising Bluetooth, WiFi, ultrasonic wave, or radio frequency.

19. The Smart Watch according to claim 1, wherein the control circuit module is adapted to automatically run a program under selected conditions.

20. The Smart Watch according to claim 1, wherein the Smart Watch comprises a record button.

* * * * *